United States Patent [19]

Cozens

[11] Patent Number: 4,539,381

[45] Date of Patent: Sep. 3, 1985

[54] CHELATE-ACTIVATED VINYL CHLORIDE POLYMERIZATION PROCESS

[75] Inventor: Ross J. Cozens, Welwyn Garden City, England

[73] Assignee: Imperial Chemical Industries PLC, London, England

[21] Appl. No.: 488,608

[22] Filed: Apr. 25, 1983

[30] Foreign Application Priority Data

May 6, 1982 [GB] United Kingdom ............... 8213055

[51] Int. Cl.³ .............................................. C08F 2/18
[52] U.S. Cl. ........................................ 526/93; 526/90; 526/344.2
[58] Field of Search .............................. 526/91, 93, 94

[56] References Cited

U.S. PATENT DOCUMENTS 4,091,197 5/1978 Fischer ............................ 526/93
4,205,161 5/1980 Wiest ............................... 526/200

FOREIGN PATENT DOCUMENTS 0038634 10/1981 European Pat. Off. .
152347 11/1981 German Democratic Rep. .
1136326 12/1968 United Kingdom .
1435425 5/1976 United Kingdom .

Primary Examiner—Christopher A. Henderson
Attorney, Agent, or Firm—Cushman, Darby & Cushman

[57] ABSTRACT

Process for the polymerization of vinyl chloride in aqueous suspension or microsuspension using an organo-soluble free-radical-yielding initiator wherein the initiator is progressively activated during polymerization by the progressive reduction of a non-initiator-activating water-soluble metal chelate complex to an initiator-activating form of the complex (which is otherwise substantially stable under the polymerization conditions) in which the metal is in a lower oxidation state, preferably a one- or two lower oxidation state.

10 Claims, No Drawings

CHELATE-ACTIVATED VINYL CHLORIDE POLYMERIZATION PROCESS

BACKGROUND OF THE INVENTION

1. Field of the Invention

The present invention relates to a process for the polymerisation of vinyl chloride in aqueous suspension or microsuspension and to the polymers produced by such a process.

2. Description of the Prior Art

It is well known to produce vinyl chloride polymers by using an aqueous suspension polymerisation process in which an aqueous suspension of vinyl chloride, or vinyl chloride and a copolymerisable monomer, is polymerised using an organo-soluble free-radical-yielding initiator and a suspension agent (generally a protective colloid), the agitation (achieved e.g. with a paddle or helical stirrer) being such that a granular slurry is formed. It is likewise well-known to produce vinyl chloride polymers by using an aqueous microsuspension polymerisation in which an aqueous dispersion of vinyl chloride, or vinyl chloride and a copolymerisable monomer, in the presence of a surfactant (emulsifying agent and/or suspension agent) and an organo-soluble free radical-yielding initiator, is homogenised by subjecting it to a violent shearing action in, e.g. a colloid mill, a high speed pump or an ultrasonic device, and the resulting homogenised dispersion polymerised in a stirred reactor to yield a vinyl chloride polymer latex.

It is a desirable objective in such vinyl chloride polymerisations to have the facility of activating the organo-soluble free-radical-yielding initiator at will by means other than by thermal decomposition during the course of the polymerisation in order to achieve a significant increase in the rate of polymerisation. Such a facility has various advantages, one e.g. being the prevention of autoacceleration wherein the rate of the polymerisation reaction increases sharply towards the end of the polymerisation when most of the monomer has been converted to polymer.

In the case of aqueous microsuspension polymerisation it has been proposed that the problem of autoacceleration may be overcome to a certain extent by carrying out the polymerisation in the presence of an initially present seeding product (produced by aqueous microsuspension polymerisation) containing all the initiator necessary for the polymerisation. Such a process is described in British Pat. No. 170 963. In British Pat. No. 1 435 425 it is suggested that the effect on reducing autoacceleration by using the process of British Pat. No. 1 170 963 is limited in usefulness. In British Pat. No. 1 435 425 the problem of autoacceleration in aqueous microsuspension polymerisation is said to be effectively overcome by adopting a variant of the process of British Pat. No. 1 170 963 in which the initiator (contained in the seed polymer) is activated with a monomer-soluble metal complex, which is progressively introduced preformed, or progressively produced in-situ, throughout the polymerisation process, and is formed by reaction between a water-soluble metallic salt and a complexing agent—the complexing agent causing the metal to change from its water-soluble form to a form soluble in vinyl chloride. A variant of this technique for overcoming autoacceleration in aqueous microsuspension polymerisation is also described in European Patent Publication No. 0038634; however in the process claimed therein, the initiator is activated with a monomer-soluble metallic complex while in a "free" form, i.e. while not being contained in the particles of a preformed seeding product.

Unfortunately, the initiator activation technique described in the above-mentioned British Pat. No. 1 435 425 and European Patent Publication No. 0038634 does not appear to be applicable to ordinary aqueous suspension polymerisation. Thus, for example, I have found that if one employs the favoured activation system described and exemplified in these publications, viz the use of cupric sulphate as the water-soluble metallic salt and ascorbic acid as the complexing agent, virtually no or very little activation of the organo-soluble initiator takes place.

In East German Pat. No. 152 347 a process similar to that of European Patent Publication No. 0 038 634 (in some respects) is employed wherein an oil and/or water-soluble metallic salt in the presence of a peroxide-type initiator is intermittently or progressively treated with a reducing agent during vinyl chloride polymerisation to achieve an improved course of the reaction. As a water-soluble metallic salt, the patent exemplifies solely cupric sulphate, with ascorbic acid being used as a reducing agent. However, as mentioned above, such a system is not applicable to ordinary aqueous suspension polymerisation and East German Pat. No. 152 347 exemplifies this system only for microsuspension polymerisation. East German Pat. No. 152 347 does, however, exemplify the use of an oil-soluble metal salt (the copper salt of coconut oil fatty acid, which is principally copper laurate) with ascorbic acid as a continuously added reducing agent and employs this system to activate an ordinary suspension polymerisation.

East German Pat. No. 152 347 also mentions that it is known to initiate polymerisations using oil-soluble initiators by employing systems which contain chelate complexes. However such systems are said in the patent to be unsatisfactory from the commercial viewpoint because of the large quantities of constituents that are required leading to products of unacceptable quality and cost. Additionally, I am not aware of any disclosures concerning vinyl chloride polymerisation which employ a system comprising a chelate complex where the polymerisation initiator is progressively activated at will throughout the course of the polymerisation by chemical interaction involving the chelate complex.

I have now discovered a process whereby polymerisations in aqueous vinyl chloride suspension may be considerably and progressively activated using systems which employ certain chelate complexes, normally in a very small truly catalytic quantity, thereby allowing a significantly increased polymerisation rate to be achieved. The process is equally applicable to polymerisations in aqueous microsuspension.

SUMMARY OF THE INVENTION

According to the present invention there is provided a process for the polymerisation of vinyl chloride in aqueous suspension or microsuspension using an organo-soluble free-radical-yielding initiator wherein the initiator is progressively activated during the polymerisation, said activation being effected by the progressive reduction during the polymerisation of a non-initiator-activating water-soluble metal chelate complex which is present to an initiator-activating form of the metal chelate complex in which the metal is in a lower oxidation state.

DETAILED DESCRIPTION OF THE INVENTION

Normally the initiator-activating form of the metal chelate complex is in a one- or two-lower oxidation state, and more usually a one-lower oxidation state.

Thus in the process of the invention, the activation of the initiator is effected by an initiator-activating metal chelate complex which is formed progressively during the polymerisation reaction by the reduction (normally a one- or two-electron reduction, and more usually a one-electron reduction), using a reducing agent, of a water-soluble non-initiator-activating form of the metal chelate complex in which the metal is in a higher oxidation state (normally a one- or two-higher oxidation state, and more usually a one-higher oxidation state). This contrasts with the processes of British Pat. No. 1 435 425 and European Patent Publication No. 0 038 634 in which, for example, the initiator is said to be activated by a monomer-soluble organic complex rather than one which is predominantly soluble in water (the reduced form of the metal chelate complex is also water-soluble since there is no essential difference in steric structure between the activating and non-activating forms).

To be effective in the process of the invention, the metal chelate complex must satisfy the following requirements, as already indicated above.

Firstly it must be water-soluble in its non-activating form, and this is taken to include the case where if it is also organo-soluble to a certain extent then it must be predominantly water-soluble, i.e. more water-soluble than it is organo-soluble. If the metal chelate complex is not more water-soluble than organo-soluble it is my experience that initiator activation cannot be achieved to any significant extent in aqueous suspension polymerisation.

Secondly the non-activating form of the metal chelate complex (in which the metal is in the higher oxidation state) must be capable of undergoing a reduction (normally a one- or two-electron reduction, and more usually a one-electron reduction) under the polymerisation conditions to the activating form of the complex (where the metal is in the lower oxidation state). Generally speaking, the activating form of the metal chelate complex should preferably also be capable of undergoing a corresponding oxidation when it activates the initiator whereby the non-activating form of the complex is regenerated. Accordingly, it is preferable for the metal chelate complex to be amenable to a reduction-/oxidation cycle (normally a one- or two-electron reduction/oxidation cycle, and more usually a one-electron reduction/oxidation cycle) corresponding to the reduction of the non-activating form of the complex by a reducing agent to generate the activating form of the complex (in which the metal is in a lower oxidation state) and the subsequent oxidation of this form of the complex when it activates the initiator to regenerate the non-activating form of the complex; the metal chelates thus far investigated which are effective in the process of the invention are considered to be of this type as can be seen from a study of relevant scientific literature concerning such types of chelate which indicates they can undergo reversible redox behaviour (e.g. J. Halpern, B12, Chapter 14, ed. D. Dolphin, Wiley, New York (1982), p 515; G. Costa, Coord. Chem. Revs., 8, pp 67–69 (1972) and references therein). In such an embodiment it is thus possible for an extremely small quantity of metal chelate complex to be employed (i.e. a truly catalytic quantity) in contrast to the processes of British Pat. No. 1 435 425 and European Patent Publication No. 0038634 where a much larger quantity of the water-soluble salt used for the generation of the monomer-soluble complex is required. For example, in the processes of both British Pat. No. 1 435 425 and European Patent Publication No. 0038634 the preferred molar ratio ranges of metallic salt/initiator are 0.1/1 to 10/1 and 0.1/1 to 5/1 respectively, i.e. the minimum preferred molar ratio of metallic salt to initiator in both processes is 0.1/1 or 1/10 (and this is confirmed by all the Examples in those publications none of which exemplify a lower minimum ratio); by contrast the present invention employs a preferred non-activating metal chelate complex/initiator molar ratio range of 1/10000 to 1/1, with a molar ratio range within this broad range of 1/1000 to 1/3, particularly 1/100 to 1/5, being adequate to provide considerable and effective activation of the initiator.

It is further also assumed that the activating form of the metal chelate complex must be substantially stable under the polymerisation conditions (apart of course from its ability to activate the initiator) otherwise it will not be able to properly effect initiator activation throughout polymerisation, particularly when a very small quantity is being employed. For example it should not undergo further reduction to form the metal or react with the water that is present. In the metal chelates thus far investigated by me which are according to the process of the invention, it is believed that the necessary stability of the activating form of the complex is achieved by electron delocalisation on the chelate ligand.

The reducing agent used to generate the activating form of the metal chelate complex from the non-activating form of the complex should effect the reduction efficiently under the polymerisation conditions employed; it should of course have no inhibiting action on the polymerisation chemistry. Preferably it should be predominantly water-soluble. Suitable reducing agents include polycarboxylic acids such as succinic acid and tartaric acid and lactones such as ascorbic acid and its esters. Ascorbic acid is a particularly preferred reducing agent in the process of the invention. Generally speaking, the molar ratio of non-initiator-activating metal chelate complex/reducing agent is preferably in the range 1/1 to 1/100, more preferably in the range 1/1.3 to 1/100, and particularly 1/1.3 to 1/20.

The fact that such large molar excesses of both the reducing agent and initiator in relation to the metal chelate complex can be effectively employed to achieve activation throughout the polymerisation is good evidence to support the above consideration that the non-activating metal chelates employed thus far in the process of the invention are undergoing a reversible reduction/oxidation cycle in the course of initiator activation to regenerate the non-initiator activating form of the metal chelate complex as described above.

In the process of the present invention, the amount of the organo-soluble free-radical-forming initiator used should not be so high as to produce, at the polymerisation temperature employed, a quantity of polymerisation-initiating free radicals by a purely thermal mechanism which will render control of the polymerisation rate by the metallic chelate complex difficult to achieve. On the other hand, the amount of initiator used should not be so low that it is all consumed before the required conversion to polymer has been reached and cannot therefore provide an acceptable reaction rate when activated throughout the polymerisation. Thus the amount of the initiator used, the amount of non-activating metal chelate complex used and the rate of generation of the activating form of the complex therefrom can be combined to achieve an acceptably rapid polymerisation reaction rate during the polymerisation. If desired, this may be so as to achieve a substantially constant polymerisation rate during the polymerisation; in this way, autoacceleration may be readily avoided coupled with a good rate of polymerisation.

The initiator employed in the process should be an organo-soluble free-radical-yielding initiator (and particularly one soluble in vinyl chloride) capable of being activated by the metal chelate complex to form free-radicals. Preferably it has a half life of $\geq 5$ hours, particularly $\geq 20$ hours, at 50° C. More reactive initiators are not always practicable to use in the process of the invention because they will be too rapidly decomposed by thermal means alone. Suitable initiators particularly include 2,4-dichlorobenzoyl peroxide, caprylyl peroxide, lauroyl peroxide, t-butyl peroxyisobutyrate, benzoyl peroxide, p-chlorobenzoyl peroxide, t-butyl peracetate, t-butyl perbenzoate, dicumyl peroxide, di-t-butyl peroxide, di(tertiarybutylcyclohexyl) peroxydicarbonate and dicyclohexyl peroxydicarbonate. Diacyl peroxides such as lauroyl peroxide and moderately active peroxydicarbonates such as di(tertiarybutylcyclohexyl) peroxydicarbonate and dicyclohexyl peroxydicarbonate are particularly preferred.

The metals that may be used for the metal chelate complexes include iron, copper, cobalt, chromium, manganese, nickel, zinc and tin.

The following are examples of metal chelate complexes, being described in their non-activating higher oxidation state forms, which are effective in the process of the invention.

Bis(dimethylglyoximato)copper (II); abbrev. Cu(dmgH)$_2$. This complex is soluble in water and moderately (but less) organo-soluble. Source: preformed from alcoholic solutions of cupric acetate and dimethylglyoxime (or formed in-situ from the same reagents).

(Ethylenediamine tetra-acetic acid)nickel(II); abbrev. Ni(EDTA). This complex is very soluble in water and sparingly organo-soluble. Source: prepared in-situ from a solution of nickel chloride and ethylenediamine tetra-acetic acid, disodium salt.

Bis(butanedionemonoximato)copper(II); abbrev. Cu(bdm)$_2$. This complex is very soluble in water and sparingly organo-soluble. Source: preformed by mixing alcoholic solutions of cupric acetate and 2,3-butanedione monoxime.

Nickel(II)(1,4,8,11-tetramethyl)-1,4,8,11-tetraazocyclotetradecane perchlorate; abbrev. Ni(TETA). This complex is very soluble in water and moderately organo-soluble. Source: preformed from alcoholic solutions of nickel perchlorate and the macrocyclic ligand.

Copper(II)(1,4,8,11-tetraazocyclotetradecane)diacetate; abbrev. Cu(TACTD). This complex is soluble in water and sparingly organo-soluble. Source: preformed from alcoholic solutions of cupric acetate and the macrocyclic ligand.

Tris(2,2'-bipyridyl)cobalt(III)trichloride; abbrev. Co(bipy)$_3$Cl$_3$. This complex is very soluble in water and moderately organo-soluble. Source: preformed from alcoholic solutions of Co(NH$_3$)$_5$Cl$_3$ and 2,2'-bipyridyl.

Tris(1,10-phenanthrolinyl)cobalt(III)trichloride; abbrev. Co(phen)$_3$Cl$_3$. This complex is very soluble in water and moderately organo-soluble. Source: preformed from alcoholic solutions of Co(NH$_3$)$_5$Cl$_3$ and 1,10-phenanthroline.

The following are examples of metal chelate complexes which are not effective in the process of the invention.

Propane-1,3-bisdiacetylmonoximato copper(II) chloride; abbrev. Cu(doH)(do)pn.Cl. This complex is moderately soluble in water and moderately organo-soluble. Source: preformed from aqueous alcoholic solutions of cupric chloride and propane-1,3-bisdiacetylmonoxime.

N,N'-ethylene-bis(salicylaldiminato)copper(II); abbrev. Cu(salen). This complex is insoluble in water and is organo-soluble. Source: preformed by mixing aqueous alcoholic solutions of cupric acetate and N,N'-ethylene-bis(salicylaldimine).

N,N'-ethylene-bis(salicylaldiminato)nickel(II); abbrev. Ni(salen). This complex is insoluble in water and is moderately organo-soluble. Source: preformed by mixing aqueous alcoholic solutions of nickel acetate and N,N'-ethylene-bis(salicylaldimine).

Bis(dimethylglyoximato)nickel(II); abbrev. Ni(dmgH)$_2$. This complex is sparingly soluble in water and sparingly organo-soluble. Source: preformed by mixing aqueous alcoholic solutions of nickel acetate and dimethyl glyoxime.

N,N'-Ethylene-bis(acetylacetoneiminato)copper(II); abbrev. Cu(baen). This complex is sparingly soluble in water and is very organo-soluble. Source: preformed by mixing alcoholic solutions of cupric acetate and N,N'-ethylene-bis(acetylacetoneimine).

N,N'-Phenylene-bis(salicylaldiminato)copper(II); abbrev. Cu(salophen). This complex is insoluble in water and is sparingly organo-soluble. Source: preformed by mixing alcoholic solutions of cupric acetate and N,N'-orthophenylene-bis(salicylaldimine).

Bis(salicylaldoximinato)copper(II); abbrev. Cu(salox)$_2$. This complex is insoluble in water and is sparingly organo-soluble. Source: preformed by mixing alcoholic solutions of cupric acetate and salicylaldoxime.

Bis(o-vanillinoximato)copper(II); abbrev. Cu(vanox)$_2$. This complex is insoluble in water and is sparingly organo-soluble. Source: preformed by mixing alcoholic solutions of cupric acetate and o-vanillinoxime.

N,N'-Ethylene-bis(acetylacetoneiminato)nickel(II); abbrev. Ni(baen). This complex is sparingly soluble in water and is very organo-soluble. Source: preformed by mixing alcoholic solutions of nickel acetate and N,N'-ethylene-bis(acetylacetoneimine).

The process of the invention is, as mentioned above, applicable to the polymerisation of vinyl chloride in both aqueous suspension and microsuspension.

In the case of suspension polymerisation the suspension agent employed is normally one or more of those used generally for the polymerisation of vinyl chloride in aqueous suspension. Examples of these include protective colloids such as partially hydrolysed polyvinyl acetate, gelatin, polyvinyl pyrrolidone, and cellulose derivatives, e.g. methyl cellulose, carboxymethyl cellulose and hydroxyethyl cellulose. The suspension agent may be used in a conventional quantity—generally speaking from 0.01 to 1% by weight calculated on monomer weight. A combination of substances, e.g. a primary and a secondary suspension agent, may be used as the suspension agent if desired rather than a single substance.

In the case of microsuspension polymerisation, any effective emulsifying agent and/or suspension agent may be used. The emulsifying agents may be anionic, cationic or non-ionic. We prefer, however, to use anionic emulsifying agents since they are more efficient in stabilising the resulting polymer latex. Examples of anionic agents are the sodium salts of sulphated and sulphonated hydrocarbons and fatty acids such as dioctyl sodium sulphosuccinate, sulphonated diesel oil and sodium lauryl sulphate and the sodium salts of alkyl aryl sulphonates such as sodium dodecyl benzene sulphonate. Suspension agents which may be used include protective colloids such as cellulose derivatives and partially hydrolysed polyvinyl acetates.

By the "polymerisation" of vinyl chloride is meant both the homopolymerisation of vinyl chloride and the copolymerisation of vinyl chloride with one or more comonomers copolymerisable therewith. Examples of the latter include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, α-olefins such as ethylene and propylene, vinyl ethers and styrene compounds. It is preferable to apply the process of the invention to the production of polymers containing at least 50% molar and more particularly at least 80% molar of units derived from vinyl chloride.

The operating conditions for polymerisation according to the present invention may be those customarily used for vinyl chloride polymerisation, the polymerisation temperature generally being between 40° and 75° C. and the pressure generally being below 15 kg/cm$^2$.

In the process of the invention the initiator may be activated at will by having the non-activating form of the metal chelate complex present in the reaction zone and progressively adding the reducing agent by varying the rate and/or moment of the addition. The rate of the polymerisation can thus be controlled at all times. For example, the rate may be increased to achieve shorter polymerisation times than can be achieved by purely thermal activation, thereby enabling e.g. cheap but (normally) fairly slow-acting initiators (such as lauroyl peroxide) to be used with greatly enhanced efficiency. Alternatively the rate may be varied according to a desired preselected profile. Also, autoacceleration may be avoided if desired by maintaining a substantially constant polymerisation rate—in which case the optimum use of the cooling capacity of the reaction vessel may be achieved, with the polymerisation being effected in the minimum time, or the same or similar polymerisation time being achieved with the use of a smaller quantity of initiator.

In addition to the advantages of the process of the present invention described hereinbefore, there are further advantages as follows. The use of a water-soluble metal chelate complex means that the bulk of the complex present at the end of polymerisation is washed out of the polymer. Further, the use of the activation system according to the invention speeds up not only the time to pressure drop but in some cases also the rate of pressure drop (pressure drop is the point in a vinyl chloride polymerisation when the autogenous running pressure in the reactor begins to fall, indicating that most of the vinyl chloride has been converted to polymer).

DESCRIPTION OF THE PREFERRED EMBODIMENTS

The present invention is now illustrated by the following Examples. Unless otherwise specified, all parts and percentages are by weight.

EXAMPLES 1 to 20

These Examples all employed vinyl chloride homopolymerisation in aqueous suspensing (in a reactor of capacity about 7 liters), using the following basic recipe:

| | |
|---|---|
| vinyl chloride | 1.41 kg |
| water | 3 liters |
| lauroyl peroxide (initiator) | 0.2% based on monomer weight |
| partially hydrolysed polyvinyl acetate (suspension agent) | 0.3% based on monomer weight |
| substance reduced to cause initiator activation (potential activator) | for type and amount see Table 1 (NB. in the case of most water-soluble metal chelates, added as an aqueous solution in 500 ml water) |
| ascorbic acid (reducing agent) | $10^{-5}$ to $10^{-4}$ mole/mole monomer, added progressively throughout polymerisation |

The stirred mixture (minus the ascorbic acid) was heated to 58° C. (the polymerisation temperature) the potential activator having been added (apart from the polymerisations where none was employed) preformed as solid or as an aqueous solution (in 500 ml water) at the same time as the lauroyl peroxide. In all cases, the potential activator caused no activation of the polymerisation reaction in the absence of the reducing agent. An aqueous solution of ascorbic acid (containing 0.7 g/litres) was added dropwise from the time the polymerisation temperature had been reached (except in the polymerisations where none was employed), the addition rate being substantially constant throughout the polymerisation and intended to cause an increased rate of polymerisation where possible (in comparison to a nonactivated polymerisation) rather than the maintenance of a substantially constant polymerisation rate throughout (which was not attempted on these small-scale runs). The polymerisation was terminated (by venting the reactor) when the pressure inside the reactor had reached approximately 2/3 the pressure at the start of pressure drop; if no pressure drop was observed, the reactor was vented after a time limit (usually 480 minutes). The resulting polymer slurry was dewatered and dried.

The details of the polymerisations are shown in Table 1. The prefix C for an Example number denotes a Comparative Example.

TABLE 1

| Ex No | Potential activator and amount (mole/mole monomer) | | Amount of ascorbic acid (mole/mole monomer) | Molar ratio potential activator to initiator | Molar ratio potential activator to ascorbic acid | Time to pressure drop (mins) | Time to vent (mins) |
|---|---|---|---|---|---|---|---|
| C1 | — | ; — | — | — | — | 465 | 520 |
| C2 | Cu(doH)(do)pnCl | ; $4.4 \times 10^{-5}$ | $1.2 \times 10^{-4}$ | 1/7.3 | 1/2.6 | 459 | 483 |
| C3 | $CuSO_4$ | ; $6.9 \times 10^{-5}$ | $1.2 \times 10^{-4}$ | 1/4.6 | 1/2 | 444 | 468 |
| C4 | Cu(salen) | ; $5.0 \times 10^{-5}$ | $1.1 \times 10^{-4}$ | 1/6.4 | 1/2.3 | 408 | 486 |
| C5 | Cu(salen) | ; $10 \times 10^{-5}$ | $2.2 \times 10^{-4}$ | 1/3.2 | 1/2.2 | nr | 510 |
| 6 | $Cu(dmgH)_2$ | ; $5.1 \times 10^{-5}$ | $1.2 \times 10^{-4}$ | 1/6.3 | 1/2.3 | 261 | 342 |
| 7 | $Cu(dmgH)_2$ | ; $2.6 \times 10^{-5}$ | $11.6 \times 10^{-5}$ | 1/12.3 | 1/4.4 | 285 | 315 |
| C8 | Ni(salen) | ; $4.5 \times 10^{-5}$ | $1.2 \times 10^{-4}$ | 1/7.1 | 1/2.6 | nr | 480 |
| C9 | $Ni(dmgH)_2$ | ; $5 \times 10^{-5}$ | $11.6 \times 10^{-5}$ | 1/6.4 | 1/2.3 | nr | 480 |
| C10 | Cu(salen) | ; $5.7 \times 10^{-6}$ | $11.6 \times 10^{-5}$ | 1/56 | 1/18 | 438 | 456 |
| 11 | Ni(EDTA) | ; $5.1 \times 10^{-5}$ | $11.6 \times 10^{-5}$ | 1/6.3 | 1/2.3 | 375 | 405 |
| C12 | — | ; — | — | — | — | 450 | 522 |
| C13 | Cu(baen) | ; $6.1 \times 10^{-5}$ | $1.2 \times 10^{-4}$ | 1/5.2 | 1/2 | 420 | 468 |
| C14 | Ni(baen) | ; $6.1 \times 10^{-5}$ | $1.2 \times 10^{-4}$ | 1/5.2 | 1/2 | nr | 480 |
| C15 | Cu(salophen) | ; $5 \times 10^{-5}$ | $1.2 \times 10^{-4}$ | 1/6.4 | 1/2.4 | nr | 480 |
| 16 | $Cu(bdm)_2$ | ; $4.4 \times 10^{-5}$ | $11.6 \times 10^{-5}$ | 1/7.3 | 1/2.6 | 234 | 309 |
| 17 | $Cu(bdm)_2$ | ; $8.8 \times 10^{-5}$ | $11.6 \times 10^{-5}$ | 1/3.6 | 1/1.3 | 276 | 336 |
| 18 | $Cu(bdm)_2$ | ; $4.4 \times 10^{-5}$ | $11.6 \times 10^{-5}$ | 1/7.3 | 1/2.6 | 255 | 285 |
| C19 | $Cu(vanox)_2$ | ; $6.5 \times 10^{-5}$ | $11.6 \times 10^{-5}$ | 1/4.9 | 1/1.8 | nr | 480 |
| C20 | $Cu(salox)_2$ | ; $5.1 \times 10^{-5}$ | $11.6 \times 10^{-5}$ | 1/6.3 | 1/2.3 | 411 | 486 | nr = not reached

It is thus seen that the activation according to the invention considerably speeds up the rate of polymerisation (compare Examples 6,7,11,16–18 according to the invention with Examples C1 and C12 which are unactivated controls). In the examples according to the invention, the progressive introduction of reducing agent during polymerisation maintained the increased rate of polymerisation.

EXAMPLES 21 to 30

The polymerisation procedure of Examples 1 to 20 was adopted with the same basic recipe being employed except that the polymerisation temperature was 52° C.

The details of the polymerisations are shown in Table 2.

It is seen that the activation according to the invention considerably speeds up the rate of polymerisation. In the examples according to the invention, the progressive introduction of reducing agent during polymerisation maintained the increased rate of polymerisation.

EXAMPLES 31 to 42

The same polymerisation procedure of Examples 21 to 30 was adopted (the polymerisation temperature being 52° C.) with the same basic recipe being employed except that the initiator (type and amount) was varied (see Table 3).

The details of the polymerisations are shown in Table 3.

TABLE 2

| Ex No | Potential activator and amount (mole/mole monomer) | | Amount of ascorbic acid (mole/mole monomer) | Molar ratio potential activator to initiator | Molar ratio potential activator to ascorbic acid | Time to pressure drop (mins) | Time to vent (mins) |
|---|---|---|---|---|---|---|---|
| C21 | — | ; — | — | — | — | 775 | 805 |
| C22 | — | ; — | — | — | — | 780 | 900 |
| 23 | $Cu(dmgH)_2$ | ; $5.1 \times 10^{-5}$ | $11.6 \times 10^{-5}$ | 1/6.3 | 1/2.3 | 390 | 510 |
| 24 | Ni(TETA) | ; $6.5 \times 10^{-6}$ | $5.8 \times 10^{-5}$ | 1/49 | 1/9 | 570 | 630 |
| 25 | $Cu(bdm)_2$ | ; $11.5 \times 10^{-6}$ | $23.2 \times 10^{-5}$ | 1/28 | 1/20 | 590 | 615 |
| 26 | $Cu(bdm)_2$ | ; $2.3 \times 10^{-5}$ | $23.2 \times 10^{-5}$ | 1/14 | 1/10 | 570 | 600 |
| 27 | $Cu(bdm)_2$ | ; $4.6 \times 10^{-5}$ | $23.2 \times 10^{-5}$ | 1/6.9 | 1/5 | 305 | 376 |
| C28 | Ni(doH)(do)pnCl | ; $3 \times 10^{-6}$ | $23.2 \times 10^{-5}$ | 1/106 | 1/78 | 800 | 1080 |
| 29 | Cu(TACTD) | ; $34.5 \times 10^{-6}$ | $23.2 \times 10^{-5}$ | 1/9.3 | 1/6.7 | 570 | 640 |
| 30 | Cu(TACTD) | ; $6.9 \times 10^{-5}$ | $23.2 \times 10^{-5}$ | 1/4.6 | 1/3.35 | 350 | 390 |

TABLE 3

| Ex No | Potential activator and amount (mole/mole monomer) | | Amount of ascorbic acid (mole/mole monomer) | Initiator and amount (% on monomer) | Molar ratio potential activator to initiator | Molar ratio potential activator to ascorbic acid | Time to pressure drop (mins) | Time to vent (mins) |
|---|---|---|---|---|---|---|---|---|
| C31 | — | ; — | — | Cyclohexyl peroxydicarbonate (0.036) | — | — | 450 | 740 |
| 32 | $Cu(dmgH)_2$ | ; $5.1 \times 10^{-5}$ | $23.2 \times 10^{-5}$ | Cyclohexyl peroxydicarbonate (0.036) | 1/6.3 | 1/4.55 | 180 | 205 |
| 33 | $Cu(bdm)_2$ | ; $23 \times 10^{-6}$ | $23.2 \times 10^{-5}$ | Cyclohexyl peroxydicarbonate (0.036) | 1/14 | 1/10 | 360 | 453 |
| C34 | — | ; — | — | Di(tertiarybutylcyclohexyl)peroxydicarbonate (0.05) | — | — | nr | 960 |
| 35 | $Cu(bdm)_2$ | ; $23 \times 10^{-6}$ | $23.2 \times 10^{-5}$ | Di(tertiarybutylcyclohexyl)peroxy- | 1/14 | 1/10 | 480 | 600 |

TABLE 3-continued

| Ex No | Potential activator and amount (mole/mole monomer) | Amount of ascorbic acid (mole/mole monomer) | Initiator and amount (% on monomer) | Molar ratio potential activator to initiator | Molar ratio potential activator to ascorbic acid | Time to pressure drop (mins) | Time to vent (mins) |
|---|---|---|---|---|---|---|---|
| C36 | $CuSO_4$ ; $34.5 \times 10^{-6}$ | $23.2 \times 10^{-5}$ | dicarbonate (0.05) Cyclohexyl peroxy-dicarbonate (0.036) | 1/9.3 | 1/6.7 | 450 | 520 |
| C37 | — | — | Lauroyl peroxide (0.2) | — | — | 700 | 785 |
| 38 | $Co(bipy)_3Cl_3$ ; $51 \times 10^{-6}$ | $23.2 \times 10^{-5}$ | Lauroyl peroxide (0.2) | 1/6.3 | 1/4.55 | 390 | 480 |
| 39 | $Co(bipy)_3Cl_3$ ; $25.5 \times 16^{-6}$ | $23.2 \times 10^{-5}$ | Lauroyl peroxide (0.2) | 1/12.5 | 1/9 | 305 | 535 |
| 40 | $Co(bipy)_3Cl_3$ ; $6.4 \times 10^{-6}$ | $23.2 \times 10^{-5}$ | Lauroyl peroxide (0.2) | 1/50 | 1/36 | 330 | 442 |
| 41 | $Co(phen)_3Cl_3$ ; $6.4 \times 10^{-6}$ | $23.2 \times 10^{-5}$ | Lauroyl peroxide (0.2) | 1/50 | 1/36 | 250 | 310 |
| 42 | $Co(phen)_3Cl_3$ ; $3.2 \times 10^{-6}$ | $23.2 \times 10^{-5}$ | Lauroyl peroxide (0.2) | 1/100 | 1/36 | 350 | 545 |

It is seen that the activation according to the invention considerably speeds up the rate of polymerisation. In the examples according to the invention, the progressive introduction of reducing agent during polymerisation maintained the increased rate of polymerisation.

I claim:

1. A process for the polymerisation of vinyl chloride in aqueous suspension or microsuspension using an organo-soluble free-radical-yielding initiator wherein the initiator is progressively activated during the polymerisation said activation being effected by the progressive reduction during the polymerisation of a non-initiator-activating water-soluble metal chelate complex which is present to an initiator-activating form of the metal chelate complex in which the metal is in a lower oxidation state and selected from the group consisting of iron, copper, cobalt, chromium, manganese, nickel, zinc and tin and ratio of non-initiator-activating metal chelate complex/initiator is within the range of from 1/10000 to 1/1.

2. A process according to claim 1 wherein the initiator-activating form of the metal complex is in a one- or two-lower oxidation state.

3. A process according to claim 1 wherein the metal chelate complex is amenable to a reduction/oxidation cycle corresponding to the reduction of the non-initiator-activating form of the complex by the reducing agent to generate the initiator-activating form of the complex (in which the metal is in a lower oxidation state) and the subsequent oxidation of this form of the complex when it activates the initiator to regenerate the non-initiator-activating form of the complex.

4. A process according to claim 1 wherein the molar ratio of non-initiator-activating metal chelate complex/initiator is within the range of from 1/1000 to 1/5.

5. A process according to claim 1 wherein the molar ratio of non-initiator-activating metal chelate complex/initiator is within the range of from 1/100 to 1/5.

6. A process according to claim 1 wherein the molar ratio of non-initiator-activating metal chelate complex/reducing agent is within the range of from 1/1 to 1/100.

7. A process according to claim 6 wherein the molar ratio of non-initiator-activating metal chelate complex/reducing agent is within the range of from 1/1.3 to 1/100.

8. A process according to claim 7 wherein the molar ratio of non-initiator-activating metal chelate complex/reducing agent is within the range of from 1/1.3 to 1/20.

9. A process according to claim 1 wherein the reducing agent used is ascorbic acid.

10. A process according to claim 1 wherein the metal chelate complex, described in its non-initiator-activating form, is selected from
Bis(dimethylglyoximato)copper(II),
(Ethylenediamine tetra-acetic acid)nickel(II),
Bis(butanedionemonoximato)copper(II),
Nickel(III)(1,4,8,11-tetramethyl)-1,4,8,11-tetrazocyclotetradecane perchlorate,
Copper(II)(1,4,8,11-tetraazocyclotetradecane)diacetate,
Tris(2,2'-bipyridyl)cobalt(III)trichloride, and
Tris(1,10-phenanthrolinyl)cobalt(III)trichloride.

* * * * *